W. S. ADAMS.
TRUCK DRAW BAR AND GUIDE.
APPLICATION FILED JAN. 30, 1915.
1,186,723.
Patented June 13, 1916.
2 SHEETS—SHEET 1.
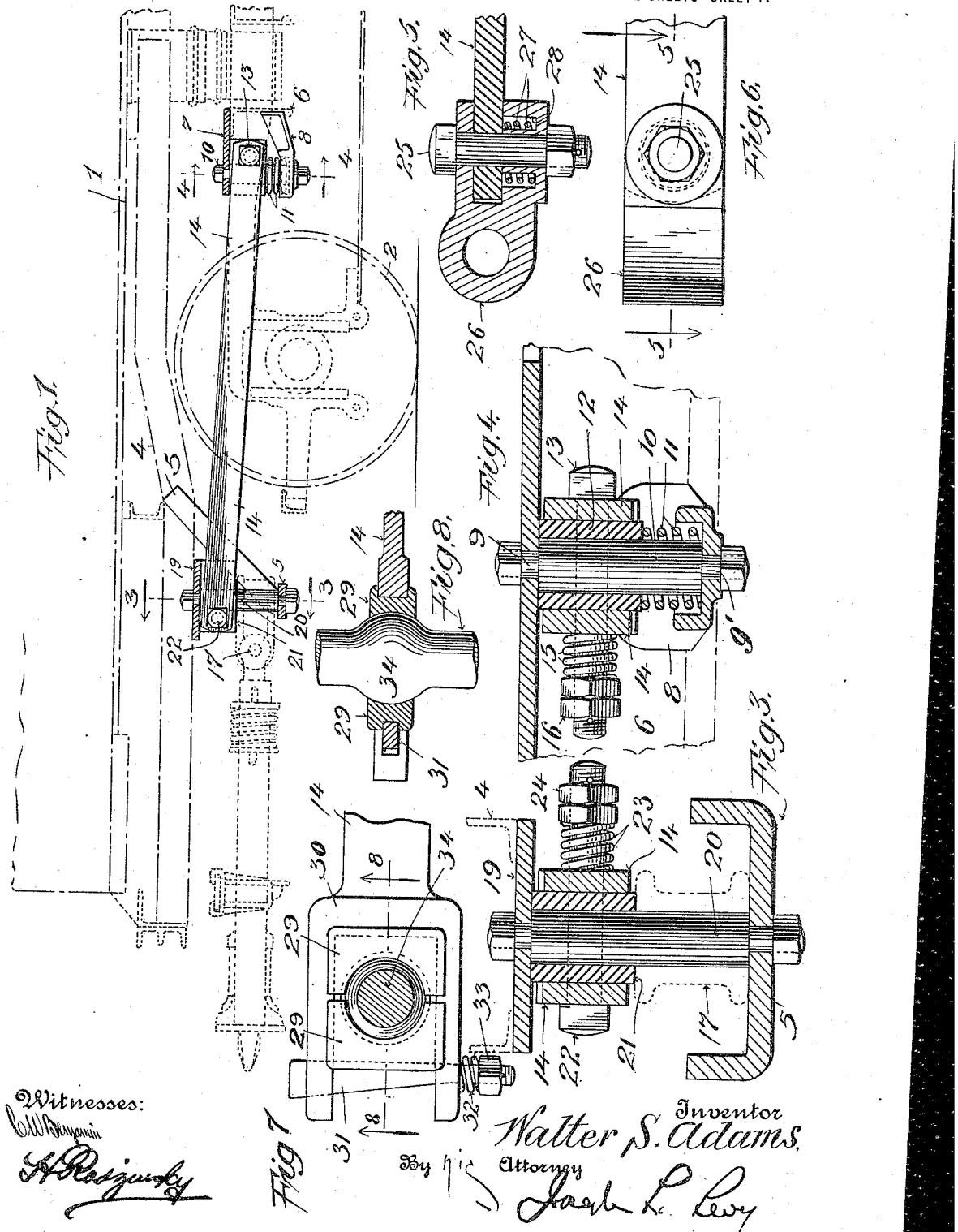
Witnesses:
Inventor
Walter S. Adams,
By his Attorney

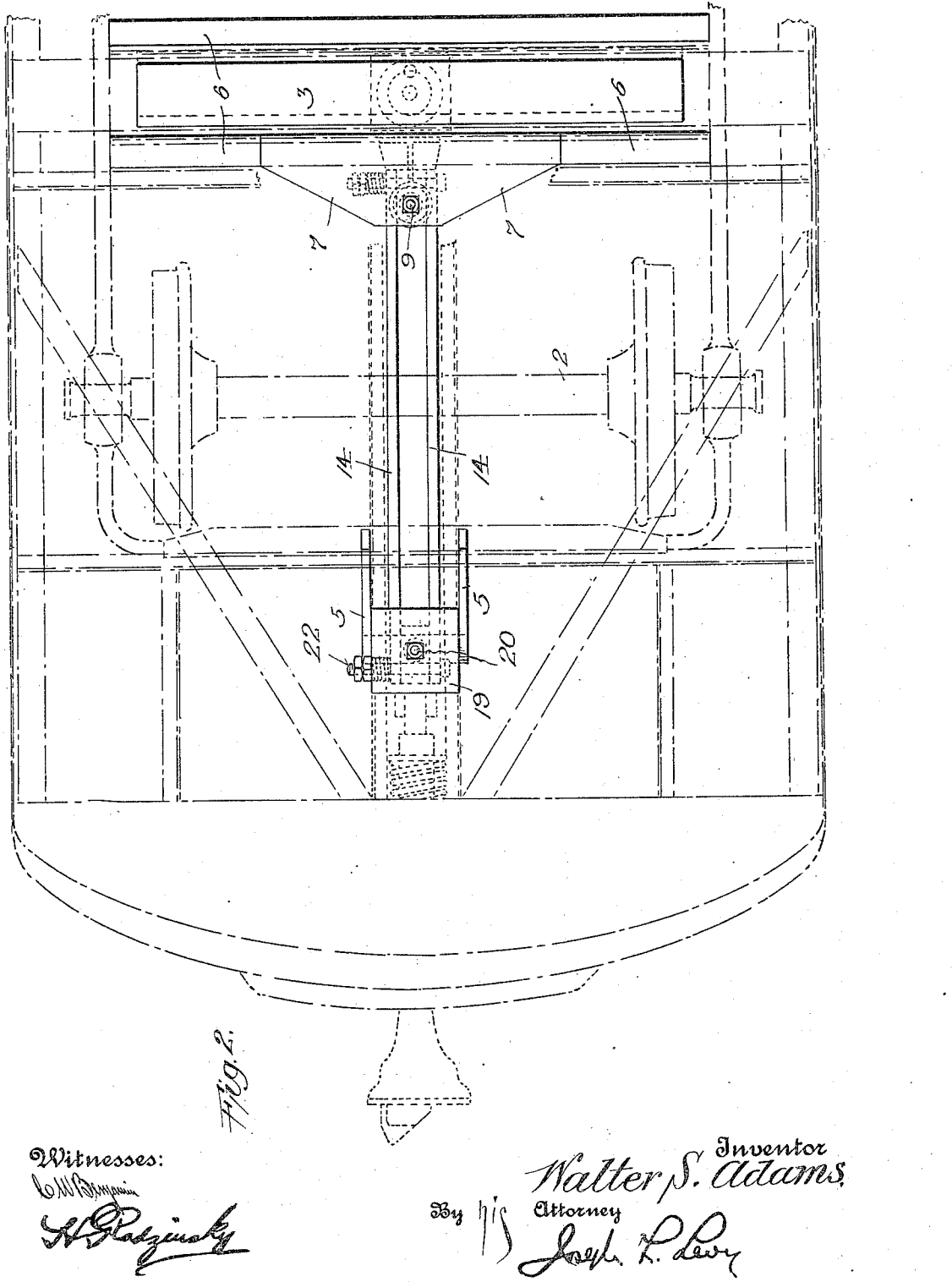

UNITED STATES PATENT OFFICE.

WALTER S. ADAMS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

TRUCK DRAW-BAR AND GUIDE.

1,186,723.   Specification of Letters Patent.   Patented June 13, 1916.

Application filed January 30, 1915. Serial No. 5,184.

*To all whom it may concern:*

Be it known that I, WALTER S. ADAMS, a citizen of the United States, and a resident of the city and county of Philadelphia, and State of Pennsylvania, have invented a new and useful Improvement in Truck Draw-Bars and Guides, of which the following is a specification.

The object of my invention is to provide a device of this class which may be attached to a truck so that when in use all tendency to an irregular or jarring motion when the brakes are applied will be overcome. Also that the draw bar pull will be transferred direct to the truck frame instead of through the car body bolster, and finally that when the brakes are applied, the pull of the brake rod and the retarding effort set up between the wheels and rail will be communicated direct to the draw bar instead of being transferred through the body bolster. Thus the truck bolster and body bolster are relieved of all stresses except those due to the weight of the car body and passengers. These objects are accomplished by my invention, some embodiments of which are hereinafter set forth.

For a more particular description of my invention, reference is to be had to the accompanying drawing forming a part hereof, in which—

Figure 1 is a side elevation of my improvement, the parts connected therewith being shown diagrammatically in dotted lines; Fig. 2 is a plan view of the same; Fig. 3 is a sectional view, taken on the line 3—3 of Fig. 1, looking in the direction of the arrows; Fig. 4 is a sectional view, taken on the line 4—4 of Fig. 1, looking in the direction of the arrows; and Figs. 5, 6, 7 and 8 show two modifications of my device, one modification being shown in Figs. 5 and 6, and the other in Figs. 7 and 8.

Throughout the various views of the drawings, similar reference characters designate similar parts.

The car body 1 is carried at one end by a truck 2 through the usual bolster 3 and connected parts. The car 1 has a stringer 4 from which is suspended a suitable bracket 5 that runs to a lower level in a diagonal direction, and thence transversely and horizontally and thence upwardly to a second stringer where it is secured as indicated. The truck 2 rotates about a king bolt in the conventional manner and can move slightly in any direction because of the spring mounting of the bolster 3. The truck 2 has transoms 6 running in the conventional manner, or other corresponding parts, on one of which is fixed a plate 7 in any suitable way, as by bolts, not shown, and below this plate 7 is a bracket 8 which is also fixed on the transom and connected to the plate 7 by means of a suitable bolt 10. This bolt 10 is shouldered at its ends as shown at 9, 9', which shoulders abut against the bracket 8 and plate 7, and surrounding this bolt is a suitable coiled spring 11 which presses a perforated block 12 against the under-side of the plate 7. This block 12 turns freely on the bolt 10 and is provided with a second perforation through which extends a bolt 13 on which are mounted two parallel bars 14. One of these bars 14 is pressed by a coiled spring 15 so as to hold the bars true, and the bolt 13 is provided with a suitable lock nut 16 which presses against the spring 15 and holds the same in place. The forward ends of the bars 14 are raised slightly so as to be held above a draw bar 17 (or any other suitable location on car body) in a manner which will now be described.

The bracket 5 has a bolt 20 similar to bolt 10 mounted thereon which runs upwardly to a plate 19 which is fixed to the under-surface of the stringers 4, and this bolt 20 is sandwiched in between the bracket 5 and the plate 19. On the bracket 5, and pivotally mounted on the bolt 20 is one end of the draw bar 17, as shown, and above this and between it and the plate 19 is pivotally mounted a block 21 similar to block 12 to which the parallel bars 14 are secured by means of a suitable bolt 22 with its coiled spring 23 and lock nuts 24 the same as the connections at the other end of these bars 14 with the block 12.

It will be noted that the connections are so arranged that when the structure above described is in use, all strains from the draw bar 17 are transmitted to the bolt 20 and thence to the block 21 and from there partly through the bolt 22 to the bars 14 and partly to the bracket 5 and plate 19. From the bars 14 the stresses are again transmitted through the bolt 13 to the block 12 and thence to the bolt 10 and from it to the bracket 8 and plate 7, and from thence to the frame of the truck 2, where the connections are made as shown.

It is to be noted that when the pair of trucks under a car pivot when taking a curve the distance between the king bolt, or pivotal center of the truck and the bolt 20, attached to the car body underframe increases. In order that this extra distance above mentioned, occasioned by the pivotal movements of the truck may be compensated for, I do not rigidly confine the truck bolster 3 within the truck frame, but allow the same to have a movement longitudinally of the truck and between the transoms 6, the usual chafing plates generally used being omitted to allow such movement of the bolster. It will be noted that when the car enters the curve and the truck bolster 3 pivots under the car, the bolster is free to move between the transoms, as heretofore mentioned, and is drawn toward the end of the car, as indicated in dotted lines in Fig. 2, whereby the increase of distance between the pivotal connection of the truck bolster and the bolt 20 occasioned by the pivotal movement of the car truck is compensated for by the movement of the bolster between the transoms, and the space between one side of the bolster and the transom adjacent that side is increased and the space on the other side decreased.

In the foregoing, two parallel bars 14 have been shown but this is not essential. One bar 14 may be employed, as shown in Figs. 5 to 8 inclusive. In the modification shown in Figs. 5 and 6, the bar 14 is provided with a perforation, near each of its ends, one end only being shown, the other being identical therewith, and through this perforation is passed a suitable bolt 25 which secures this bar 14 to a suitable lock 26 perforated at 26' to accommodate bolts 10 and 20 and a concealed spring 27 in a suitable socket 28 prevents the bar 14 from rattling. In Figs. 7 and 8 the bar 14 is provided with suitable brasses 29 sliding in the forked end 30, in the conventional manner, and wear is taken up by means of the wedge 31 mounted in the usual way and provided with a suitable coiled spring 32 and lock nut 33. The brasses 29 have a spherical seat adapted to receive bolts 10 and 20 which will be formed with a spherical central part 34.

It will be noted in the various embodiments of my invention above described that the ends of the bars 14 are so mounted that these bars will always swing free and without binding when in the performance of their functions so that these bars may properly transmit the stresses placed upon them, as above described.

While I have shown and described some embodiments of my invention, it is obvious that it is not restricted thereto, but is broad enough to cover all structures which come within the scope of the annexed claims.

Having thus described my invention, what I claim is:

1. In a device of the class described, a car frame, a draw bar, a car truck, a bolster in said truck movable longitudinally of the truck and means connecting the draw bar to the car truck and car frame.

2. In a device of the class described, a car frame, a draw bar, a truck, means connecting the draw bar to the truck frame, means connecting the draw bar to the car frame and a bolster within the truck frame movable in said frame longitudinally of the car truck.

3. In a device of the class described, a car frame, a draw bar connected thereto, a truck, a bolster movably mounted within the truck, and means connecting the draw bar and truck frame so that draw bar stresses are communicated partly to the car frame and partly to the truck frame.

4. In a device of the class described, a car body, a draw bar pivotally connected thereto, a truck, a bolster movably mounted within said truck, and a bar pivotally connected to said car body and to said truck.

5. In a device of the class described, a car frame, a draw bar connected thereto, a truck, a bolster movably mounted within said truck, a bolt connected to said draw bar, a second bolt connected to said truck and a bar connecting said bolts and pivotally mounted thereon.

6. In a device of the class described, a car body, a draw bar running to a bolt, means for supporting the bolt on the car underframe, a truck, a bolster mounted in said truck and movable longitudinally of the same, a bolt carried by said truck and a bar pivotally connected to each of said bolts.

7. In a device of the class described, a car frame, a bolt extending downward from said frame, a car truck, a bolt mounted on the car truck, a bar connecting said bolts and having a vertical and horizontal pivotal movement thereon and a bolster movably mounted in the truck frame whereby the truck can pivot on its axis.

8. In a device of the class described, a car frame, a car truck, a bolster movably mounted in said truck, a bolt secured to the car frame, a bolt secured to the car truck, and a pair of parallel bars pivotally mounted at the ends, on said bolts.

9. In a device of the class described, a car frame, a car truck, a bolster movably mounted in said car truck, a bolt on the car frame for engagement by a draw bar, a bolt on the car truck, blocks pivotally mounted on said bolts and a pair of parallel bars connecting said blocks and pivotally mounted thereon.

Signed in the city and county of Philadelphia, and State of Pennsylvania, this 28th day of January, 1915.

WALTER S. ADAMS.

Witnesses:
HENRY C. ESLING,
H. F. McKILLIP.